Aug. 23, 1949. W. W. HANSEN 2,479,568
DOPPLER RADAR SYSTEM
Filed Aug. 19, 1943 2 Sheets-Sheet 1
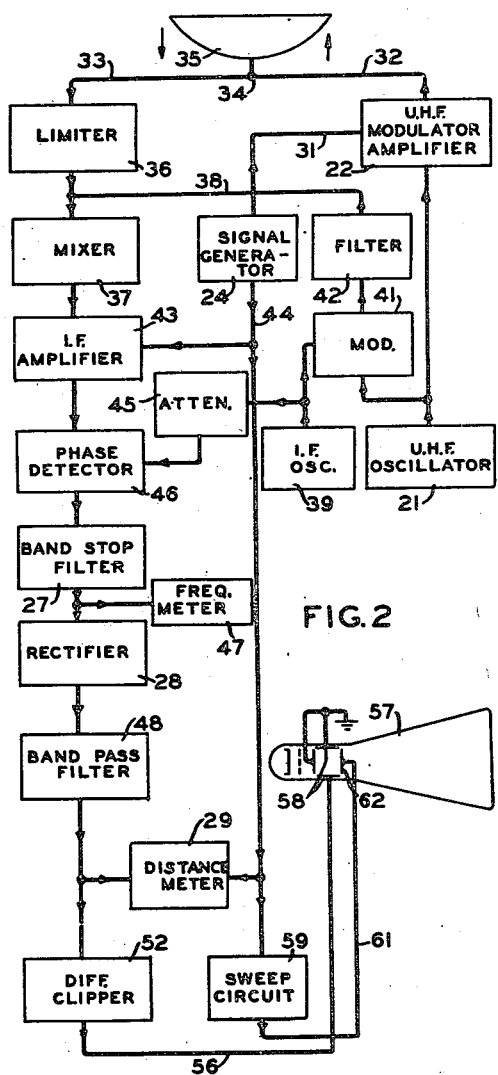
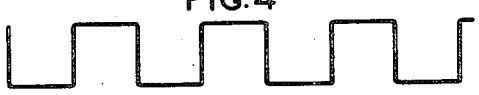
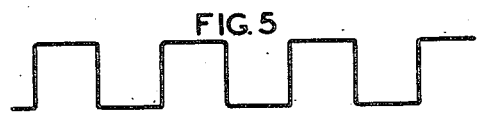
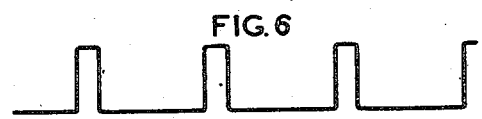
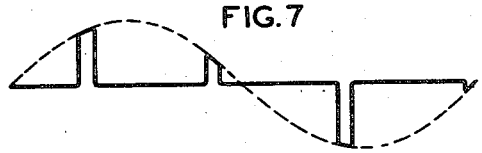
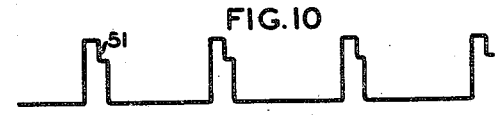
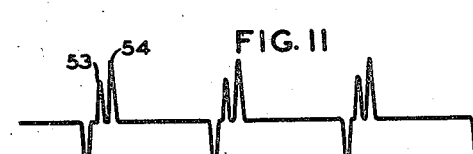
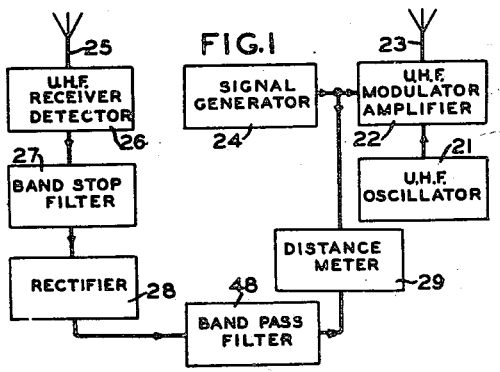
INVENTOR
W. W. HANSEN
BY
ATTORNEY Aug. 23, 1949.    W. W. HANSEN    2,479,568
DOPPLER RADAR SYSTEM
Filed Aug. 19, 1943    2 Sheets-Sheet 2

INVENTOR
W. W. HANSEN
BY
ATTORNEY

Patented Aug. 23, 1949

2,479,568

UNITED STATES PATENT OFFICE 2,479,568

DOPPLER RADAR SYSTEM

William W. Hansen, Garden City, N. Y., assignor to The Sperry Corporation, a corporation of Delaware Application August 19, 1943, Serial No. 499,208

21 Claims. (Cl. 343—9)

The present invention relates generally to radio object detection and location and, more particularly, to novel means and methods for measuring the distance to objects with radio systems employing the Doppler phenomenon for detection.

It is well known that when a reflecting object has a component of velocity relative to a radio transmitter, that portion of the intercepted radiant energy returned toward the source of radiation differs in frequency from the transmitted energy because of the Doppler effect. This frequency difference is directly proportional to both the radial velocity of the object and the frequency of the transmitted wave. The radiated and reflected waves may be mixed in a detector to produce a beat frequency or Doppler beat note revealing the presence of the moving object, and this frequency may then be measured to provide an accurate knowledge of the radial velocity of the object. The distance to the object, however, is not so readily measured.

It is therefore the principal object of the invention to provide novel and improved means and methods for measuring distance to remote objects having motion relative to the measuring point.

Another object is to provide a radio distance measuring system that is sensitive only to moving objects and wherein alternate operation of a transmitter and a receiver results in simplified antenna structure, reduced noise level in the receiver, and increased responsiveness to distant objects relative to near objects.

Yet another object lies in the provision of a radio object locator system that is insensitive to undesired reflections from stationary objects and that measures the distances to objects having motion relative to said system in terms of time delays or phase shifts caused in the envelope of a radio frequency wave by the finite passage time of said wave to and from said objects.

A further object of the invention is to provide a radio object locator that not only discriminates between stationary and moving objects but also distinguishes between moving objects having a common goniometric position on the basis of differences in the radial distances of said objects with respect to said locator.

Still another object is to provide a radio object locator adapted to transmit radio frequency energy periodically, to receive energy reflected from remote objects, and to suppress in the received energy harmonics including the fundamental of the periodicity of transmission, thus substantially eliminating the sensitivity of the locator to energy scattered by the ground or returned from stationary objects.

A yet further object is to provide a radio locating system utilizing the Doppler phenomenon for the detection of moving objects and requiring only a very narrow frequency band in the indicating circuits of the system even when searching for objects moving at unknown velocities, thus enabling the system to discriminate effectively against noise.

Still a further object is to provide a radio locator adapted to distinguish between moving objects having a common bearing from the locator on the basis of differences in the radial velocities of said objects and to determine the individual distances of said objects so distinguished.

Other objects and advantages will become apparent from the specification, taken in connection with the accompanying drawings wherein the invention is embodied in concrete form.

In the drawings,

Fig. 1 is a block diagram of an embodiment of the present invention;

Fig. 2 is a block diagram of a particular form of the invention;

Figs. 3 through 11 are graphs of wave shapes illustrating the operation of the structure of Fig. 2;

Figure 12:
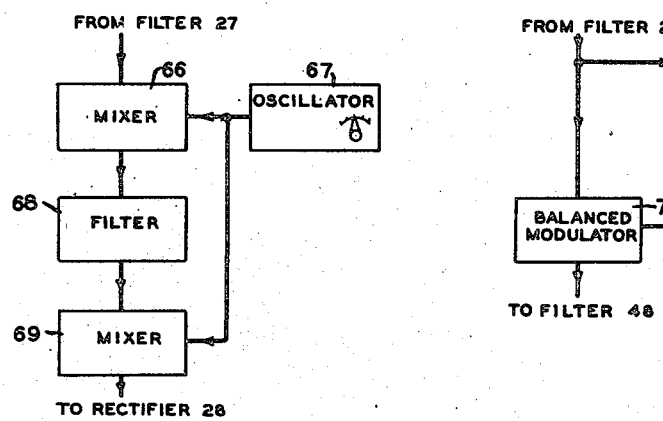
Figs. 12 and 13 are block diagrams of velocity selective circuits or gates that may be employed in the system of Fig. 2.

In Figs. 1, 2, 12 and 13, the direction of control or energy flow is represented by arrows while in Figs. 3 through 11, 15, and 16 vertical and horizontal axes represent voltage amplitude and time, respectively, drawn to an arbitrary scale. Similar characters of reference are used in all of the above figures to indicate corresponding parts.

Referring now to Fig. 1, an ultra high frequency oscillator 21 which may be a conventional velocity modulation device produces a radio wave of substantially constant frequency and amplitude which is impressed upon a modulator amplifier 22. A signal generator 24 produces a sinusoidal, rectangular, or other desired shape of modulating wave which is impressed upon modulator 22 for the purpose of varying the amplitude of the ultra high frequency wave supplied from oscillator 21. The frequency of the modulating signal from generator 24 lies in the audio range for the usual applications of the system. The output of modulator amplifier 22 is connected to a radiator indicated at reference numeral 23 by the conventional symbol. Radiator 23 is preferably directive for concentrating the transmitted energy in a limited zone. The modulated ultra high frequency wave is radiated into space, and a portion of its energy is reflected from a moving object, if present, while other portions are scattered by the ground or returned towards the transmitter from stationary objects.

A receiving antenna 25 placed near but not necessarily adjacent to radiator 23 may be similar to the latter and is adapted to collect a part of the reflected energy. The collected energy is supplied to an ultra high frequency receiver and detector 26 which may be of conventional superheterodyne or tuned radio frequency design. The detector 26 acts to mix the received frequencies. A signal wave corresponding to that produced by signal generator 24 is reproduced due to the demodulation of the radiant energy leaking directly from radiator 23 to receiving antenna 25 or returned from stationary objects. However, a Doppler beat note also occurs in the presence of a reflecting object having motion relative to the locator system. This beat note is modulated by the signal wave impressed upon the radiant energy. A filter 27 supplied by the detector 26 is adapted to eliminate the signal frequency from the waves produced by the detector 26 without appreciably attenuating the modulated Doppler beat note wave.

The filter 27 therefore suppresses responses of the locating system to ground scattering and interference from other stationary objects. If the signal is not a sine wave, filter 27 is adapted to suppress higher harmonics as well as the fundamental frequency of the signal wave. The output voltage of filter 27 comprises the modulated Doppler beat note wave substantially unchanged. A rectifier 28 demodulates the beat note and reproduces the signal which originated in the signal generator 24. The reproduced signal is phase shifted or delayed in time according to the distance of the moving object from the locating system. This signal could be immediately compared in phase with the original signal supplied by the generator 24 to obtain a determination of the unknown distance. It is, however, preferable to pass the wave from rectifier 28 through a noise eliminating band pass filter 48 before abstracting the distance information therefrom. Filter 48 is the converse of filter 27 in that it transmits only the signal frequency or this and higher harmonics if the signal is not a sine wave. The action of filter 48 is to eliminate substantially all modulation of the signal wave and a very considerable amount of noise. The elimination of noise is of utmost importance in a radio object locating system since the energy reflected back to any system by an object such as an aircraft is of minute intensity. Prior art systems have disclosed means and methods for reducing the required frequency band width after an object has been detected, thereby improving a visual indication of the object or the automatic tracking of the same in one or more spatial coordinates. The present means and method of discriminating against noise is, however, effective even in searching for objects. It is to be observed that irrespective of the frequency of the Doppler beat note resulting from the previously unknown velocity of an object, the filter 48 need only pass a single fixed frequency or fixed harmonically related frequencies. A distance meter 29 is employed to measure the phase displacement or time delay between the original signal and the reproduced and filtered signal from device 48, thus providing an indication of the unknown distance.

It has been stated that the modulating signal provided by generator 24 may have any periodic wave shape. There are, however, special advantages to be obtained by employing a rectangular or substantially square signal with which to key the ultra high frequency modulator amplifier 22. Fig. 2 illustrates the system of Fig. 1 particularly adapted to utilize this type of signal wave. It will be shown that the operation of the transmitter and receiver may be separated in time. This substantially eliminates spurious modulation of the receiver caused by direct leakage of the transmitter energy from the radiator 23 to the antenna 25. This leakage may effect statistical noise modulation which increases the receiver hiss level. The time separation of the transmitter and receiver enables a single radiator to take the place of duplicate structures. Alternate operation of the receiver and transmitter also serves to reduce the blanketing effect of adjacent moving objects. These near objects tend to overload the amplifying circuits of a receiver with their strong reflections, thus obscuring responses to objects at the maximum desired range of the system. It will be subsequently seen that square wave keying of the transmitter and receiver increases the responsiveness of the locating system to distant objects relative to near objects.

Referring now to Fig. 2, the ultra high frequency oscillator 21 is connected as before to the modulator amplifier 22. The signal generator 24 is adapted to modulate or key the ultra high frequency energy with a square wave introduced over lead 31 and illustrated in Fig. 3. The transmitter is keyed on and off for equal time intervals at such a repetition rate that a time delay results during the transit period to and from objects moving at the maximum desired range equal to one-half the keying cycle. Specifically, this frequency is equal to the velocity of wave propagation divided by four times the maximum desired range. For example, a 465-cycle modulation signal is employed for a maximum range of approximately one hundred miles. The keyed or modulated radio frequency energy is supplied over a line 32, such as a suitable wave guide to a directive radiator 35 which is indicated as a parabola but may of course be an electromagnetic horn or other directive structure. Although it is incidental to the invention, the radiator 35 may be adapted to scan an area with its directive beam by appropriate mechanical actuation of a type well known in radio locating systems.

The reflected and scattered energy is also received by radiator 35 and conducted over a line 33 similar to line 32 to a limiter 36. The limiter or switch 36 prevents the high power transmitted wave from affecting the subsequent receiving circuits and also prevents waste of transmitter energy therein, while allowing the relatively weak received energy to pass through with little attenuation. There may also be provided, if desired, other switching means associated with the output circuit of modulator amplifier 22 to avoid loss of received energy in the transmitting circuits. Although such switching devices are well known in the art, one possible form of the limiter 36 is briefly discussed. The limiter 36 may be of the gaseous discharge type, well known to the art, which consists of a gas-filled resonant chamber containing electrodes and maintained close to the ionization condition. The limiter is adapted to discharge when strongly excited and thus effectively damp the exciting oscillations. The electrical length of line 33 is adjusted to reflect a very high impedance at the junction 34 with the transmitting line 32 when the modulator amplifier 22 is energized and the high power wave, upon attempting to pass through the limiter, discharges the resonant chamber and creates substantially a short circuit therein. The received reflected energy, however, is not of such intensity as to cause a gaseous discharge and therefore passes substantially unattenuated through limiter 36 and is applied to a mixer 37, wherein the energy is heterodyned with a local oscillator frequency supplied over a lead 38 and derived in the following manner.

An oscillator 39 is adjusted to provide a wave of a suitable intermediate frequency or submultiple thereof. The intermediate frequency wave is fed to the signal input of a modulator 41 which is provided with a carrier frequency from the ultra high frequency oscillator 21. The output of modulator 41 contains frequencies equal to the carrier and a plurality of side bands. A filter 42 selects one of the side bands that is spaced the intermediate frequency from the carrier frequency and rejects the other waves. Thus, the voltage supplied over lead 38 has substantially constant amplitude and always differs from the transmitted frequency by exactly the desired intermediate frequency. The mixing of the output voltage from limiter 36 and the voltage supplied over lead 38 results in a band of frequencies grouped around the intermediate frequency.

The output of mixer 37 is connected to an intermediate frequency amplifier 43 whose operation is controlled by the signal generator 24 by means of a voltage supplied over a lead 44 to screen grids or other control electrodes associated with the amplifier 43. The voltage on lead 44 is substantially the reverse of that supplied over lead 31 and is illustrated in Fig. 4 where it will be observed that the off periods for the receiver correspond to on periods for the transmitter and vice versa. In practice it is usual to leave a slight blank interval between the transmitter and receiver operating periods to allow limiter 36 to deionize and to reduce radio frequency leakage. The output of amplifier 43 is combined in a phase detector, balanced modulator, or other detector 46 with a wave of intermediate frequency taken from oscillator 39 and suitably reduced in amplitude by an attenuator 45. Detector 46 reproduces frequency components of the signal wave from generator 24 and Doppler frequency waves modulated by this signal corresponding to any radially moving objects in the transmitted beam.

Now for explanatory purposes only, since it is not essential to the operation of the system, let it be assumed that the intermediate frequency amplifier 43 amplifies a frequency band wide enough to preserve fairly well the corners of the pulses due to the square wave keying. Then a stationary object at approximately one-third of the maximum range provides a reflected wave having an idealized square wave radio frequency envelope that is illustrated in Fig. 5. The wave shown in Fig. 5 is delayed in time due to the transit interval to and from the object so that it lags the envelope of the originally transmitted wave as shown in Fig. 3. This time interval causes the last part of the reflected energy to arrive back at the radiator 35 after the receiver has been made responsive in accordance with the wave shown in Fig. 4. The portion of the wave amplified by amplifier 43 and detected by the device 46 is illustrated in Fig. 6 where it is observed that each detected pulse starts when the receiver is gated or keyed open and stops at a time determined by the range of the object. Although the width of the pulses due to stationary objects is a function of the distance, it is noted that the periodicity of the pulses remains unchanged and that a Fourier analysis of the frequencies comprising these pulses contains only the fundamental and higher harmonics of the square wave frequency. It is further observed that since nearby objects produce short pulses and the pulse width increases progressively until at the maximum range the received pulses correspond exactly with the receiver keying wave as shown in Fig. 4, the relative sensitivity of the receiving apparatus to remote objects has been improved according to the second power of the range.

A reflection from a moving object at, say, one-quarter of the maximum range produces a series of pulses in the detector 46 such as those shown in Fig. 7. Here it is observed that the wave consists of the Doppler beat note due to the relative motion of the object as modulated or keyed at the square wave periodicity. The lowest and leading Fourier components in the wave shown in Fig. 7 are the Doppler frequency and the Doppler plus and minus the square wave frequency.

The waves detected in device 46 are impressed upon the band stop filter 27, which in this form of the invention has a series of harmonically related substantially infinite attenuation frequencies corresponding to the fundamental and higher harmonics of the square wave frequency. Therefore, there are no signals at the output of filter 27 due to ground objects. In systems adapted for long range it is convenient to reduce the attenuation requirements of filter 27 by slightly narrowing the keying wave employed to energize the amplifier 43 and illustrated in Fig. 4. The result is that very strong reflections from close objects finish returning to the system during the short interval immediately after the transmission period and before the receiver has been made responsive. On the other hand, signals due to moving objects are undisturbed by filter 27 since they do not contain the square wave frequency unless it happens that the Doppler frequency is harmonically related to the square wave frequency.

In practice, the Doppler beat note from a single object is not monochromatic due to the modulation caused by the variation of the effective cross-section of the object from moment to moment. For example, when an aircraft is the moving object that it is desired to detect, the different parts of the craft have different velocities due to slight alterations in attitude, and, therefore, these parts contribute slightly different Doppler frequencies to the reflected energy. As a result, the Doppler beat note is a band of frequencies whose width is proportional to the maximum difference in velocity between the separate parts of the aircraft. Also, there is always a considerable reflection due to the propeller which is spread in frequency. Therefore, there is virtually no danger of filtering out the desired signals, since the stop bands in filter 27 are considerably narrower than the Doppler frequency band, and in addition, propeller modulation also passes through filter 27. A frequency meter 47 is connected to the output of filter 27 and is adapted to measure the frequency of the predominant Doppler frequency and thereby determine the radial velocity of the object.

The rectifier 28 is connected to the filter 27, as previously shown above in Fig. 1. Rectifier 28 in this case is preferably but not necessarily a device of the full-wave type which acts to invert the negative half of the wave shown in Fig. 7 so that the rectified wave appears substantially as shown in Fig. 8 and now contains the square wave frequency plus and minus twice the Doppler frequency and various other higher harmonics and combinations. The wave provided by rectifier 28 could be directly supplied to the distance meter 29 to obtain a determination of distance, but it is preferable as in Fig. 1 to interpose the band-pass filter 48. The filter 48 in this particular case must transmit several harmonics of the keying frequency if it is desired to preserve the rectangular character of the distance determining wave. The output voltage from filter 48 therefore has the general appearance of the pulses shown in Fig. 9. These pulses not only have a width substantially proportional to the range of the moving object but also a fundamental frequency that is the same as the fundamental of the original keying or signal wave but phase shifted or time delayed according to this range. The pulses from filter 48 are supplied to the distance meter 29 which evaluates and indicates the distance.

The square wave frequency may have any relation whatever to the Doppler frequency or band of frequencies. The intermediate requency amplifier 43 may, if desired, amplify a band just wide enough to accommodate the Doppler frequencies. The square corners of the pulses shown in Figs. 6 through 9 are then rounded, but the operation of the system is essentially unchanged. When only a few harmonics of the square wave are passed by the amplifier 43 or by filter 48, a conventional phase meter may be employed for device 29, the reference wave being supplied over lead 44 from the signal generator 24. The design is conventional since the meter measures waves of constant frequency. When a square wave repetition rate is employed that is quite low in comparison with the limits of the Doppler frequencies, a considerable number of harmonics of the square wave are amplified, and the distance meter 29 under these conditions may well be of the time delay type such as are well known in pulse object locating systems. The width of the pulses may be measured directly without reference to the wave applied over lead 44, which lead may in fact be disconnected from meter 29. The pulses may actuate a trigger circuit, switch on and off an electronic counter of high frequency pulses, or control any other suitable time measuring circuit. The particular timing device employed is outside the scope of the present invention, and therefore the designation "distance meter" is intended to include any suitable well-known timing means.

Thus far, the system is adapted to provide velocity and distance indications for a single moving object. However, if the intermediate frequency amplifier 43 is designed with a band width sufficient to preserve the shape of the received pulses, a plurality of moving objects having the same goniometric position or common bearing with respect to the system may be distinguished on the basis of their difference in range.

Fig. 10 illustrates an idealized shape of the wave provided at the output of band-pass filter 48 by the presence of two moving objects. The combined reflection of both objects contributes to the first portions of the pulses, but the latter portions are contributed only by the more distant object, and there is as a result a sharp irregularity indicated at 51 when energy from the near object is discontinued. The pulses shown in Fig. 10 are applied to a differentiator and clipper 52, a well-known device which responds to the time rate of change of the impressed pulses. The differentiation of the impressed pulses is illustrated in Fig. 11 and is seen to result in sharp peaks 53 and 54 corresponding to the termination of the energy reflected from the near and far objects, respectively. Reverse peaks 55 occur corresponding to the abrupt keying on of the intermediate frequency amplifier 43, but these reverse pulses are eliminated by clipping in device 52. These pulses corresponding to detected objects may be supplied over a lead 56 to an oscilloscope 57. The oscilloscope 57 may utilize the pulses according to any of the prior art techniques, and merely for illustrative purposes, the lead 56 is applied to vertical deflection electrodes 58. A sweep circuit 59 is energized by the square wave from lead 44 and is adapted to produce a linear time sweep voltage which is impressed through lead 61 onto horizontal deflection electrodes 62. This simplified sweep causes the pulses 53 and 54 to appear on the oscilloscope screen like one of the groups shown in Fig. 11 without, however, the presence of inverted pulse 55. A plurality of targets may thus be clearly distinguished, and the spacing between the peak waves caused by these targets is proportional to their distance separation.

It is not necessary to employ the differentiator circuit 52 in order to obtain the pulses corresponding to the individual objects. The differentiation may be accomplished in band pass filter 48 by appropriately altering its attenuation characteristics. It can be shown that if the filter 48 attenuates the second harmonic of the keying frequency one half as much as it attenuates the fundamental, the third harmonic only one-third of the fundamental, and in general attenuates the $n$th harmonic $1/n$ of the fundamental frequency, the output wave of filter 48 corresponds to the differential of the impressed distance determining wave.

Figure 14:
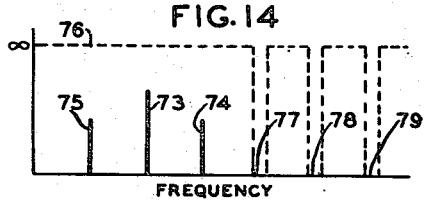
Fig. 14 is a graph illustrating the operation of the circuit shown in Fig. 12.
Figure 15:
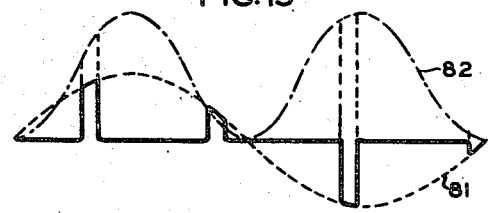
Figs. 15 and 16 are graphs of wave shapes illustrating the operation of the circuit shown in Fig. 13.

Another method of discriminating between detected moving objects having a common bearing from the locating system is in terms of their radial velocities. A suitable means for selecting a particular object from among a group of objects lying along the same line of sight is illustrated in Fig. 12 and is adapted to be inserted between filter 27 and rectifier 28. The output wave from filter 27 contains, as most important components, the Doppler frequency and the Doppler frequency plus and minus the repetition or keying frequency. These frequencies are illustrated by lines 73, 74 and 75, respectively, represented on an amplitude versus frequency graph in Fig. 14. The spacing between these frequencies is constant because of the constant repetition rate, but their position on the frequency scale is determined by the radial velocity of the object. A plurality of objects provides a plurality of these frequency groups, but in general the groups are mutually displaced because of differences between the radial velocities of the individual objects.

The output of filter 27 is connected to a mixer 66 wherein the modulated Doppler beat note waves are heterodyned with a frequency supplied from a tunable oscillator 67. The output of the mixer 66 is connected to a filter 68 which is designed to have an attenuation characteristic shown in an attenuation versus frequency graph indicated by a dashed line 76 in Fig. 14. The filter 68 is adapted to suppress all frequencies except those lying within narrow bands 77, 78 and 79. The frequency bands 77, 78 and 79 are grouped at some convenient frequency lying well outside the frequency limits of the Doppler beat notes. The centers of these pass bands are spaced an amount equal to the repetition or keying frequency. The oscillator 67 is adjusted so that the frequencies caused by the object that it is desired to select are shifted by the heterodyning action of mixer 66 to the multiple pass bands of the filter 68. The output wave of the filter 68 is impressed on a mixer 69 wherein this wave is returned to its original frequency by beating with the frequency from the oscillator 67. The output of mixer 69 therefore contains the frequencies from the desired object substantially unchanged, but the response of the distance indicators 29 or 57 to moving objects having dissimilar velocities is eliminated.

Figure 13:
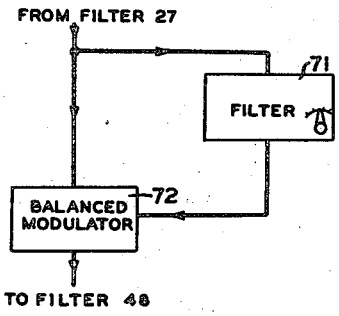
Figure 16:
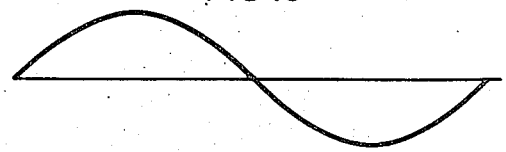

Another form of velocity selective circuit for use between filter 27 and filter 48 is shown in Fig. 13. The frequencies issuing from filter 27 are applied to a balanced modulator 72 and also to a tunable filter 71. The filter 71 is adapted to select the Doppler frequency resulting from any particular object while attenuating the Doppler side bands and all frequencies caused by other objects. This Doppler frequency is illustrated in Fig. 16 and is shown to correspond to the envelope indicated at 81 in Fig. 15 of the pulse wave it is desired to select. The balanced modulator acts to multiply the pulse wave of Fig. 15 by the Doppler wave of Fig. 16, and the resultant pulses in the output of device 72 have an envelope shape as indicated at 82. It is observed that the action of the balanced modulator is to rectify the desired pulses while pulses having envelopes of different frequency are not so converted. The pulses from the desired object are therefore in condition to pass through the filter 48 while the pulses from other objects are attenuated thereby.

For the sake of brevity and clarity, references in the claims to harmonics of the signal, modulating, or keying waves are intended to include the fundamental frequency or first harmonic of such waves. Likewise, to avoid prolixity in the claims, the terms "moving" and "stationary" are intended to refer to objects whose distance relative to the measuring viewpoint is in the former instance changing with time and in the latter instance substantially constant.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:
1. A method of determining the distance to a moving object comprising the steps of generating a radio frequency wave, modulating said wave with a signal, radiating said modulated wave toward said moving object, receiving said wave as reflected from said moving object and as returned by ground scattering, detecting said received waves to reproduce said signal due to said ground scattering and a beat note wave modulated by said signal due to said moving object, suppressing said reproduced signal, rectifying said beat note wave, and comparing the resultant signal with the modulating signal to determine the time delay and thus the distance to said moving object.

2. A method of determining the distance to an object having motion relative to the point of measurement comprising the steps of radiating a radio frequency wave in pulses, receiving said wave during intervals between pulses after said wave has been reflected from said object and returned by ground scattering, detecting a beat note wave corresponding to the frequency difference between said radiated and received waves caused by said relative motion, said beat note wave having interruptions at the rate of said pulses of said radio frequency wave, removing frequency components harmonically related to said pulse rate caused by said ground scattering, rectifying said beat note wave to reproduce said interruptions, and measuring the length of said interruptions to determine the distance to said object.

3. A distance measuring radio system comprising means for generating a radio frequency wave, means for modulating said wave with a signal, means for radiating said modulated wave into space, means for receiving said modulated wave after reflection from an object having motion relative to said system, means for detecting a beat note wave due to said relative motion corresponding to the frequency difference between said radiated and received waves, said beat note being modulated by said signal, means for filtering said beat note wave to remove frequency components of said signal reproduced due to reflections from stationary objects, means for detecting said filtered beat note wave to reproduce said signal, and means for comparing the phase of said original and reproduced signals to obtain a determination of the distance to said object.

4. In a distance measuring radio system, means for generating a radio frequency wave, means for modulating said wave with a signal, means for radiating said modulated wave into space, means for receiving said modulated wave after reflection from an object having motion relative to said system, means for detecting a beat note wave due to said relative motion corresponding to the frequency difference between said radiated and received waves, said beat note being modulated by said signal, and means for filtering said beat note wave to remove frequency components of said signal reproduced due to reflections from stationary objects.

5. In a radio system for determining the distance of an object having motion relative to said system, the combination comprising transmitting means for radiating radio frequency waves toward said object, receiving means responsive at least in part to said waves after reflection from said object, detecting means for comparing frequencies related to said radiated and reflected waves to obtain a beat note wave occasioned by said relative motion, control means for alternately inhibiting the operation of said transmitting and receiving means periodically, filter means supplied from said detecting means for suppressing frequencies harmonically related to the periodicity of operation of said transmitting and receiving means, and means energized by said filter means for indicating the distance of said moving object.

6. In an object locating radio system providing a plurality of Doppler beat notes modulated at a repetition rate, means for selecting the modulating signal from one of said modulated beat notes corresponding to a moving object concerning which positional information is to be derived comprising, means for abstracting from said modulated beat notes the Doppler frequency corresponding to the radial velocity of said object, balanced modulator means responsive to said modulated beat notes and to said Doppler frequency for rectifying said one of said modulated beat notes, and filter means for attenuating frequencies other than harmonics of said repetition rate, said filter means serving to transmit substantially only frequency components comprising said modulating signal of said one of said modulated beat notes.

7. In an object locating radio system providing a plurality of Doppler beat notes modulated at a repetition frequency, means for selecting one of said modulated beat notes corresponding to a moving object concerning which positional information is to be derived comprising, filter means having a plurality of transmission frequency bands, the frequency spacing between adjacent bands being substantially equal to said repetition frequency, and means including a tunable oscillator for translating frequency components of said one of said modulated beat notes to lie within said filter transmission bands, said filter serving to transmit substantially only said translated frequencies of said one of said modulated beat notes.

8. In an object locating radio system, a transmitter for radiating radio frequency energy in pulses, a receiver responsive to said energy for reproducing said pulses and Doppler beat notes modulated by said pulses caused by reflections of said energy from stationary and moving objects, respectively, a first filter for attenuating said reproduced pulses while transmitting said modulated Doppler beat notes, means for rectifying said modulated Doppler beat notes to recover said pulses modulated thereon, and a second filter for transmitting said recovered pulses while attenuating noise interference differing in frequency from the components comprising said recovered pulses.

9. In a radio system, the combination of an intermittently operable transmitter for radiating a radio wave toward mobile reflecting objects, a receiver operable during the quiescent periods of said transmitter for receiving radio waves reflected from said irradiated objects, a detector for demodulating waves whose frequencies differ in accordance with the differences between the frequency of said radiated wave and the frequencies of said reflected waves, a filter supplied signals from said detector for substantially suppressing any signal of a frequency equal to the rate of operation of said transmitter and receiver, and rectifying means responsive to signals passing through said filter for recreating, in the presence of an object having appreciable motion relative to said radio system, an output signal of a frequency equal to said suppressed signal and independent of the velocity of the object.

10. In a distance measuring radio system, the combination of an intermittently operable transmitter for radiating a radio wave toward mobile reflecting objects, a receiver operable during the quiescent periods of said transmitter for receiving radio waves reflected from said irradiated objects, a detector for demodulating waves whose frequencies differ in accordance with the differences between the frequency of said radiated wave and the frequencies of said reflected waves, a filter supplied signals from said detector for substantially suppressing any signal of a frequency equal to the rate of operation of said transmitter and receiver, rectifying means responsive to signals passing through said filter for recreating, in the presence of an object having appreciable motion relative to said radio system, a signal having the same frequency as said suppressed signal, and an indicator responsive to a characteristic of said recreated signal for indicating the distance to said moving object.

11. In a distance measuring radio system, the combination of an intermittently operable transmitter for radiating a radio wave toward reflecting objects which may be mobile, a receiver operable during the quiescent periods of said transmitter for receiving radio waves reflected from said irradiated objects, a detector for demodulating waves whose frequencies differ in accordance with the differences between the frequency of said radiated wave and the frequencies of said reflected waves, a first filter supplied signals from said detector for substantially suppressing any signal of a frequency equal to the rate of operation of said transmitter and receiver, rectifying means responsive to signals passing through said first filter for recreating, in the presence of an object having appreciable motion relative to said radio system, a signal having the same frequency as said suppressed signal, a second filter for passing substantially only said recreated signal whereby spurious noise is eliminated, and an indicator responsive to a characteristic of said filtered recreated signal for indicating the distance to said moving object.

12. In a radio system, the combination comprising a radio transmitter for radiating a wave toward reflecting objects which may be mobile, modulating means for impressing a modulating signal on said wave, a receiver for receiving radio waves reflected from said irradiated objects, a detector for demodulating waves whose frequencies differ in accordance with the differences between the frequency of said radiated wave and the frequencies of said reflected waves, a filter supplied waves from said detector for substantially suppressing any signal of a frequency equal to said modulating signal, rectifying means responsive to waves passing through said filter for recreating, in the presence of an object having appreciable motion relative to said radio system, an output signal of a frequency equal to said modulating signal and independent of the velocity of the object.

13. In a distance measuring radio system, the combination comprising a radio transmitter for radiating a wave toward mobile reflecting objects, modulating means for impressing a modulating signal on said wave, a receiver for receiving radio waves reflected from said irradiated objects, a detector for demodulating waves whose frequencies differ in accordance with the differences between the frequency of said radiated wave and the frequencies of said reflected waves, a filter supplied waves from said detector for substantially suppressing any signal of a frequency equal to said modulating signal, rectifying means responsive to waves passing through said filter for recreating, in the presence of an object having appreciable motion relative to said radio system, a signal equal in frequency to said modulating signal, and an indicator responsive to a characteristic of said recreated signal for indicating the distance to said moving object.

14. In a radio system, the combination comprising a radio transmitter for radiating a wave toward mobile reflecting objects, modulating means for impressing a modulating signal on said wave, a receiver for receiving radio waves reflected from said irradiated objects, a detector for demodulating waves whose frequencies differ in accordance with the differences between the frequency of said radiated wave and the frequencies of said reflected waves, a first filter supplied waves from said detector for substantially suppressing any signal having a frequency equal to said modulating signal, rectifying means responsive to waves passing through said first filter for recreating, in the presence of an object having appreciable motion relative to said radio system, a signal equal in frequency to said modulating signal, a second filter for passing substantially only said recreated signal whereby spurious noise is eliminated, and an indicator responsive to a characteristic of said filtered recreated signal for indicating the distance to said moving object.

15. In a distance measuring radio system, the combination comprising a transmitter for radiating a radio wave toward mobile reflecting objects, a receiver for receiving radio waves reflected from said irradiated objects, means generating a keying wave for rendering said transmitter and said receiver alternately operative, a detector coupled to said receiver for demodulating waves whose frequencies differ in accordance with the differences between the frequency of said radiated wave and the frequencies of said reflected waves, a filter supplied signals from said detector for substantially suppressing detected versions of said keying wave, rectifying means responsive to signals passing through said filter for recreating, in the presence of an object having appreciable motion relative to said radio system, a version of said keying wave, and means for measuring the width of said recreated version of said keying wave to determine the distance to said moving object.

16. In a distance measuring radio system, the combination comprising a transmitter for radiating a radio wave toward mobile reflecting objects, a receiver for receiving radio waves reflected from said irradiated objects, means generating a keying wave for rendering said transmitter and said receiver alternately operative, a detector coupled to said receiver for demodulating waves whose frequencies differ in accordance with the differences between the frequency of said radiated wave and the frequencies of said reflected waves, a filter supplied signals from said detector for substantially suppressing detected versions of said keying wave, rectifying means responsive to signals passing through said filter for recreating, in the presence of an object having appreciable motion relative to said radio system, a version of said keying wave, and means for measuring the phase of said recreated version of said keying wave relative to the phase of said keying wave to determine the distance to said moving object.

17. In a distance measuring radio system, the combination comprising a transmitter for radiating a radio wave toward mobile reflecting objects, a receiver for receiving radio waves reflected from said irradiated objects, means generating a keying wave for rendering said transmitter and said receiver alternately operative, a detector coupled to said receiver for demodulating waves whose frequencies differ in accordance with the differences between the frequency of said radiated wave and the frequencies of said reflected waves, a first filter supplied signals from said detector for substantially suppressing detected versions of said keying wave, rectifying means responsive to signals passing through said first filter for recreating, in the presence of an object having appreciable motion relative to said radio system, a version of said keying wave, a second filter for passing substantially only said recreated version of said keying wave whereby spurious noise is eliminated, and means for measuring the width of said recreated version of said keying wave to determine the distance to said moving object.

18. In a distance measuring radio system, the combination comprising a transmitter for radiating a radio wave toward mobile reflecting objects, a receiver for receiving radio waves reflected from said irradiated objects, means generating a keying wave for rendering said transmitter and said receiver alternately operative, a detector coupled to said receiver for demodulating waves whose frequencies differ in accordance with the differences between the frequency of said radiated wave and the frequencies of said reflected waves, a first filter supplied signals from said detector for substantially suppressing detected versions of said keying wave, rectifying means responsive to signals passing through said first filter for recreating, in the presence of an object having appreciable motion relative to said radio system, a version of said keying wave, a second filter for passing substantially only said recreated version of said keying wave whereby spurious noise is eliminated, and means for measuring the phase of said recreated version of said keying wave relative to the phase of said keying wave to determine the distance to said moving object.

19. In a radio system, the combination comprising a transmitter for radiating a radio wave toward mobile reflecting objects, a receiver for receiving waves reflected from said irradiated objects, means generating a keying wave for rendering said transmitter and said receiver alternately operative, a detector coupled to said receiver for demodulating waves whose frequencies differ in accordance with the differences between the frequency of said radiated wave and the frequencies of said reflected waves, a first filter supplied waves from said detector for substantially suppressing detected versions of said keying wave, rectifying means responsive to waves passing through said first filter for recreating, in the presence of objects having an appreciable motion relative to said radio system, versions of said keying wave, a second filter for passing substantially only said recreated versions of said keying wave whereby spurious noise is eliminated, means responsive to the time rate of change of said filtered recreated wave versions for creating pulses corresponding to each of said moving objects, and means responsive to said pulses for indicating said objects.

20. In an object locating radio system providing a plurality of audio frequency waves modulated by a signal, means for selecting the modulation signal impressed on one of said audio frequency waves representative of a moving object concerning which positional information is desired comprising means for abstracting from said modulated waves a carrier wave having an audio frequency corresponding to the velocity of said object relative to said system, means for multiplying said modulated waves by said abstracted carrier wave to reproduce the modulation signal associated with said abstracted carrier wave, and filter means for attenuating frequencies other than that of the modulation signal, said filter means thereby serving to transmit substantially only the modulation signal representative of said object.

21. In an object locating radio system providing a plurality of audio frequency waves keyed by a signal, means for selecting the keying signal of one of said audio frequency waves representative of a moving object concerning which positional information is desired comprising, means for abstracting from said keyed waves a carrier wave having an audio frequency corresponding to the velocity of said object relative to said system, means for multiplying said keyed waves by said abstracted carrier wave to reproduce the keying signal associated with said abstracted carrier wave, and filter means for attenuating frequencies other than those of the keying signal, said filter means thereby serving to transmit substantially only the keying signal representative of said object.

WILLIAM W. HANSEN.

REFERENCES CITED

The following references are of record in the file of this patent:

UNITED STATES PATENTS

| Number | Name | Date |
| --- | --- | --- |
| 1,639,667 | Ranger | Aug. 23, 1927 |
| 1,750,668 | Green | Mar. 18, 1930 |
| 2,055,883 | Terry | Sept. 29, 1936 |
| 2,134,716 | Gunn | Nov. 1, 1938 |
| 2,236,893 | Chaffee | Apr. 1, 1941 |
| 2,248,727 | Strobel | July 8, 1941 |
| 2,301,929 | Budenbom | Nov. 17, 1942 |
| 2,402,464 | Suter | June 18, 1946 |
| 2,406,316 | Blumlein | Aug. 27, 1946 |
| 2,424,263 | Woodyard | July 22, 1947 |